Figure 1:
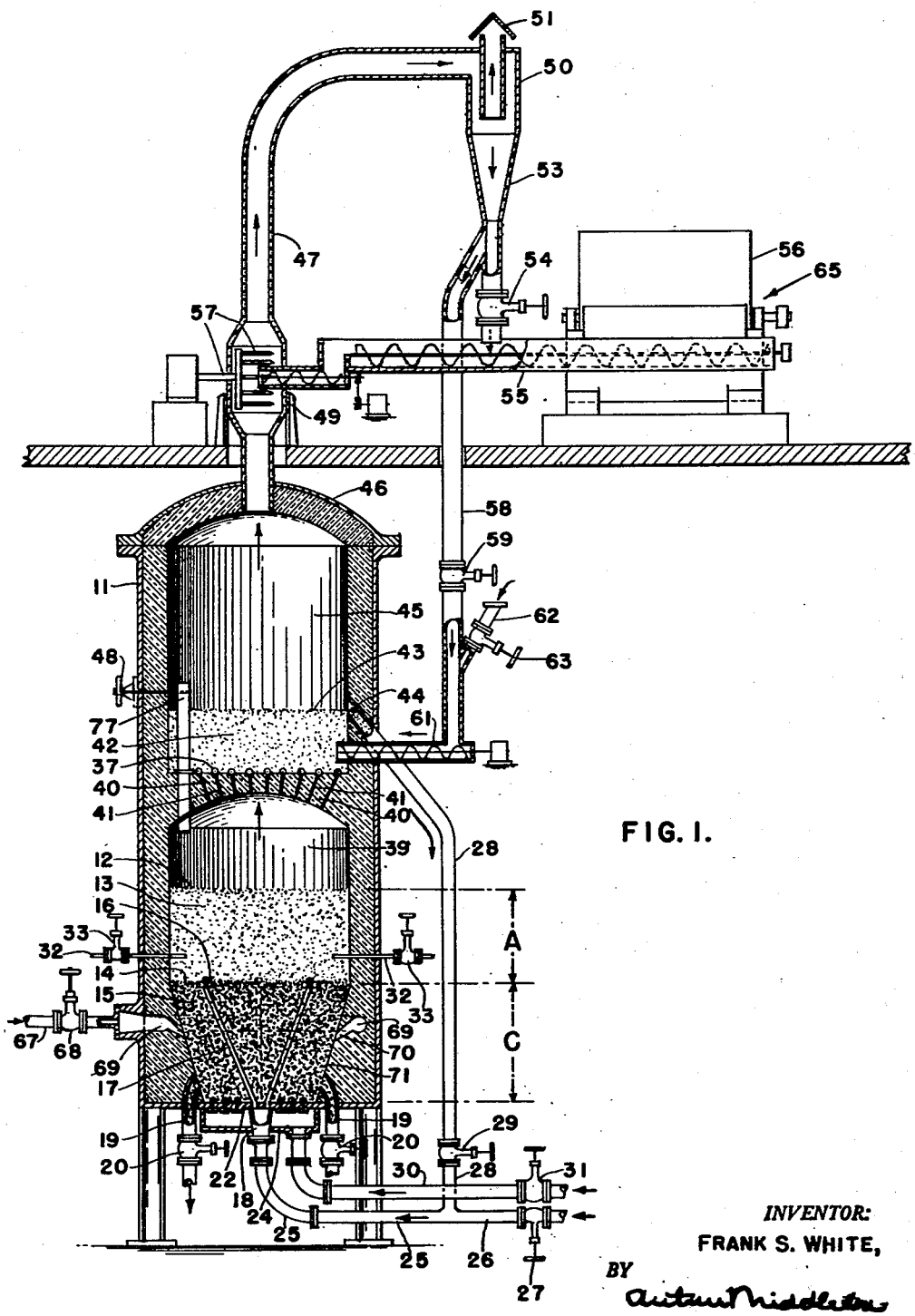

March 29, 1949.  F. S. WHITE  2,465,410
CALCINING LIME BEARING SLUDGE
Filed June 28, 1946  2 Sheets-Sheet 1

INVENTOR:
FRANK S. WHITE,
BY
*Arthur Middleton*
ATTORNEY

March 29, 1949.   F. S. WHITE   2,465,410
CALCINING LIME BEARING SLUDGE
Filed June 28, 1946   2 Sheets-Sheet 2
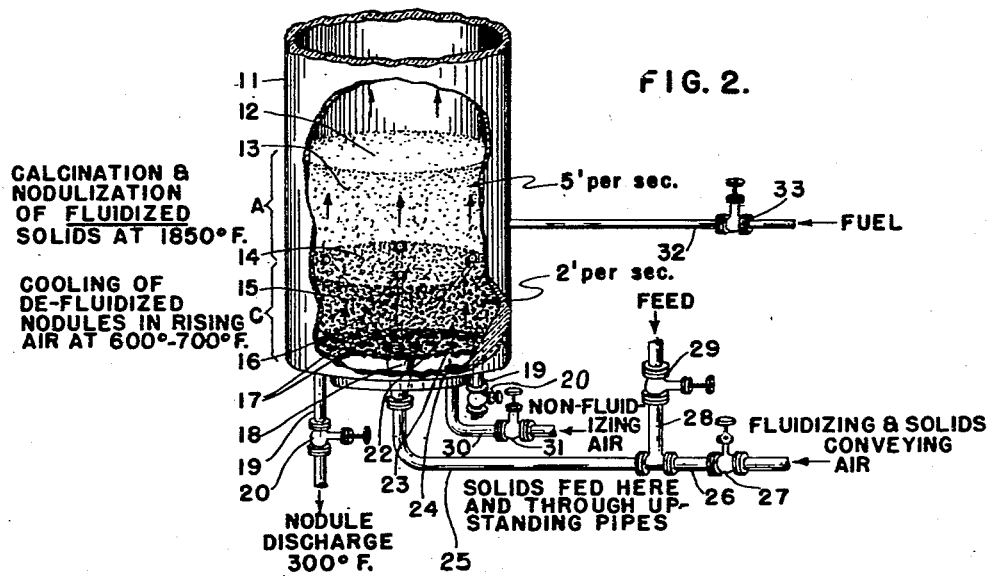
FIG. 2.
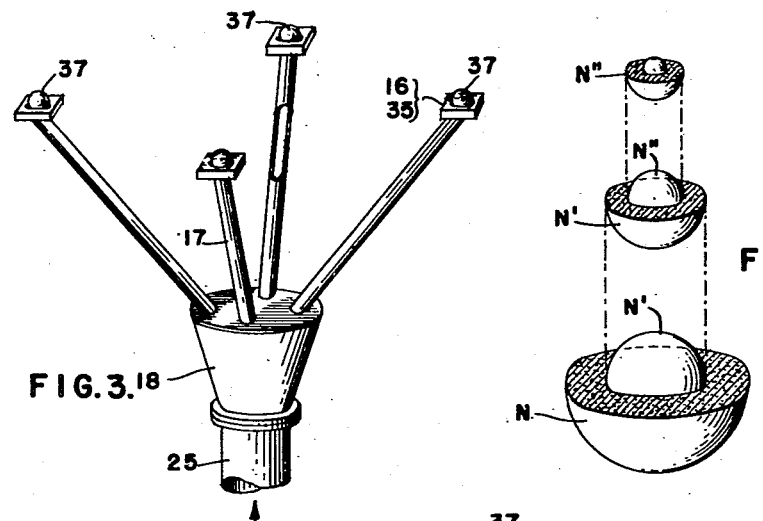
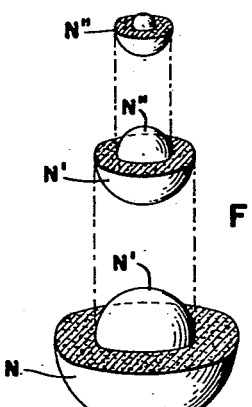
FIG. 6.
FIG. 3.
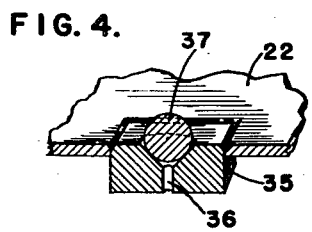
FIG. 4.
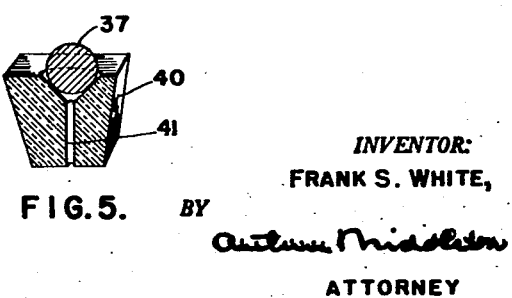
FIG. 5.
INVENTOR:
FRANK S. WHITE,
BY
Arthur Middleton
ATTORNEY Patented Mar. 29, 1949

2,465,410

UNITED STATES PATENT OFFICE 2,465,410

CALCINING LIME BEARING SLUDGE

Frank S. White, Westport, Conn., assignor to The Dorr Company, New York, N. Y., a corporation of Delaware Application June 28, 1946, Serial No. 680,191

11 Claims. (Cl. 23—186)

This invention relates to the calcination and nodulization of trade sludges or slurries that are lime-bearing, such as paper mill causticizing sludge, water softening sludge, sludge from first carbonation or other lime sludge producing stations in sugar factories, and so on.

Such sludges are currently burned or calcined in kilns or reverberatory furnaces but the expense thereof is high and their operation not particularly efficient, partly because of lack of close temperature control both generally and locally, and high dust losses. So it is one object of this invention to devise ways and means for overcoming such disadvantages. Another object is to produce the calcined product in the form of substantially dust-free nodules or pellets. A further object is to treat the sludge in a single bed of solids in a reactor wherein calcination takes places in a superposed or superjacent fluidized zone of the bed while cooling takes place in a subjacent de-fluidized zone of the same bed. Another object is to assure the presence in the sludge to be calcined of an adhesive substance in kind and quantity which softens and becomes adhesive at temperatures somewhat less than the calcination or decomposition temperature of the sludge being calcined. Still other objects will become manifest as this specification proceeds.

The invention may be practiced in an enclosed reactor or furnace, more or less vertical in type, divided by a transverse horizontally-extending gas-permeable plate or partition, into a gas-receiving or wind-box compartment beneath the plate and a solids heat-treatment zone or compartment thereabove. A bed of solids to be treated is supported by the plate by means of an oxygen-bearing gas or air blown into and through the bed of solids so that at least the solids in the upper section or zone of the bed are in mobilized non-segregating suspension in the gas whereby they are in fluidized condition and thereby act as if they comprised a fluid. Solids in the lower section or zone of the bed are suspended enough to permit mass movement downwardly but are de-fluidized and not in true suspension. To that end, oxygen-bearing gas or air is blown through constricting apertures or orifices in the plate in sufficient quantity and at just enough rising velocity to permit of the mass movement of solids in the lower zone, while a supplemental quantity of gas or air is dispersingly delivering into the bed in a middle zone or section thereof in a rising manner, which when added to the gas or air rising in the bed from the constriction plate causes the solids of the bed that are above the delivered supplemental gas to become fluidized. The important feature here being described is that the solids in the upper zone of the bed are fluidized whereas solids passing downwardly from the upper zone of the bed to the lower zone thereof, become de-fluidized but still are capable of mass movement downwardly to discharge through discharge pipes leading from the lower zone to outside of the reactor.

Fuel is supplied to the upper zone of the bed to maintain combustion or oxidation therein. Solids are fed for treatment in the reactor into the upper zone of the bed by a special feeding device. Calcined solids are discharged from the bottom section of the lower zone of the bed. Products of combustion are discharged from the top section of the reactor. The reactor is operable on a continuous basis.

Sludge solids are provided with a proper quantity or proportion of an adhesive, of which soda is an example. The sludge and its adhesive content is more or less dried and pre-heated by rising hot products of combustion from the reactor at a temperature at which the adhesive has not softened sufficiently to cause particle agglomeration, whereupon they are blown by air or gas pressure into the middle section of the bed in the reactor—the middle section being that toward the bottom of the superjacent fluidization zone of the bed and toward the top of the subjacent de-fluidization zone of the bed. Combustion is maintained in the fluidization zone of the bed and the temperature thereof carefully controlled to be just enough above the decomposition or oxidation temperature of the sludge solids in order to effect efficient calcination thereof without using excessive fuel.

As the solids in the calcination zone are in fully fluidized gas suspension, calcination proceeds apace but there is a gradual controlled rate of descent or sinking of the hot calcined fluidized solids downwardly past the middle section of the bed into the lower or bottom zone of the bed, where due to a lesser quantity and velocity of uprising gas therein, the descending solids are de-fluidized and cease to be gas-suspended, but are capable of downward mass movement resulting in discharge thereof from the reactor because of the controlled and lessened upward velocity of gas they encounter uprising in the de-fluidization zone of the bed. The lesser quantity and velocity of air or gas uprising through this bottom zone of the bed comes thereinto through orifices in the constriction plate which supports the composite bed.

Solids in the fluidized calcination zone are incandescent but in descending or sinking into the de-fluidization zone cool quickly because they radiate or exchange their heat to the uprising gas around them. Actually, the hot solids descend against a stream of uprising cool gas, so there is effected here, countercurrent cooling, whereby heat is stripped rapidly from the descending solids. Therefore by the time the solids discharge to the atmosphere from the de-fluidization zone of the bed, they are quite cool.

The best embodiment of which I am at present informed is illustrated in the accompanying drawings, but this embodiment is shown by way of example only since it is possible to modify structural and operative details, so long as no departure is made from those required in the appended claims. In the drawings, Fig. 1 is a vertical sectional view of an embodiment of this invention with certain accessories which are helpful in practicing the invention. Fig. 2 is a partial perspective view of a reactor of this invention, for simplified explanatory purposes showing essentially the fluidized calcining and nodulizing zone with its subjacent de-fluidized cooling zone. Fig. 3 is a partial perspective view of the distributing manifold for the solids-conveying and fluidizing air supplied to the reactor. Fig. 4 is a vertical sectional view of a ball check used or usable in the constriction plate in the reactor and on the emitting terminals of the hollow arms of the distributing manifold. Fig. 5 is a vertical sectional view of a ball check such as is usable in the constriction partition beneath the preheating bed of Fig. 1. Fig. 6 is a composite figure illustrating in magnification the structural formation of the nodules resulting from the practice of this invention.

In Fig. 2, 11 indicates a heat insulated reactor with its top broken away. 12 indicates a fluid level of a fluidized bed section 13 of incandescent solids being treated in the calcining and nodulizing zone A in accordance with this invention, while 14 represents a fluid level of a de-fluidized bed section 15 of hot but cooling treated solids in the cooling de-fluidizing zone C that have descended from the superjacent fluidized bed 13 of the calcining zone A. For delivering to the fluidized bed 13, a mixture or slurry of solids to be treated and fluidizing gas or air, there extends upwardly through the de-fluidized bed 15, a distributing manifold delivery apparatus comprising hollow arms 17 each topped by or terminating in a ball check plate 16. These arms 17 rise from a manifold body 18 to which gas-conveyed feed solids are supplied. From the de-fluidized bed 15 in the cooling and de-fluidizing zone C, there is discharged through discharge pipes 19 which are controlled by valves such as 20, cooled nodules of calcined lime-bearing material.

The defluidized bed 15 is supported on a transversely-extending apertured constriction plate 22 beneath which is an air-receiving wind-box 24. 25 indicates a pipe or conduit connected to the manifold body 18 that has an extension or gas- or air-inlet pipe 26 controlled by valve 27. Pipe 25 has another extension or solids feed inlet pipe 28 controlled by valve 29. 30 represents a non-fluidizing air inlet controlled by a valve 31. 32 indicates a fuel (such as oil or gas) supply line or pipe 32 controlled by a valve 33. Fig. 4 shows the preferred construction of the constriction plate which is provided with a plurality of metal inset blocks 35 each having a funnel-shaped aperture therethrough topped or sealed with a ball check 37.

When no gas is uprising through that aperture the ball check is seated in the funnel-shaped aperture as shown to prevent solids from flowing downwardly therethrough but the ball is unseated when air is uprising through aperture 36 for the purpose of aiding in the better distribution and dispersal of gas passing upwardly into the bed of solids thereabove. The terminal plates 16 on the manifold arms 17 and the plates 35 of the constriction plate 22 are similar.

In Fig. 1 a more complete reactor is shown, usually made of refractory material, and mounted on legs if desired. Above the fluidized bed 13 is a freeboard space 39 defined at its top by a second or upper apertured constriction plate or partition 40 comprised of refractory bricks, one or more of which contain a funnel-shaped aperture 41 (more or less like aperture 36 of Fig. 4) that is topped by a ball check 37 (see Fig. 5). Supported from the upper face of the apertured partition 40 is a preheating bed 42 of fluidized solids having a fluid level 43 determined by a discharge weir 44 formed by the inlet to the pipe or conduit 28. Above the bed is a freeboard space 45 and above that is the top 46 of the reactor. 77 represents a standpipe extending vertically through the partition 40 and the bed 42 which is controlled by an opening and closing valve 48. This standpipe is for the purpose of by-passing hot gas rising from the calcining bed 13 past the bed 42 into the freeboard space 45.

From the top 46 of the reactor, there rises a stack 47 having an enlarged section 49. The stack terminates in a cyclone 50 from which gas escapes or exhausts through outlet 51 and dust or dried solids spill or descend through a downcomer pipe 53, valved at 54 leading to a pug mixer trough 55. 56 indicates a rotary filter of well-known type that delivers filter-cake into the pug-mixer 55 which re-pulps or diminutes the cake and mixes it with dried solids spilling through downcomer 53 and delivers the mixture to a motor-driven cake mill 57 in the enlarged section 49 of the stack 47. Soda ash, or other adhesive or fuser (if required) is added in the filter 56, as at 65, to be mixed with the filter-cake as and for the purposes hereinafter described. From the downcomer 53, there is an extension pipe or conduit 58, valved as at 59 that conducts dust or dried solids to a motor-driven screw conveying feeder 61 which supplies the solids into the upper fluidized bed 42 but beneath its fluid level 43. Make-up coarse limestone may be added to the dried solids pipe 58 through the make-up pipe 62 controlled as by a valve 63.

Cooling of the solids in the de-fluidized bed section 15 may be facilitated, if desired, by supplying air through pipe 67, valved at 68, leading to a circular bustle pipe 69 in the reactor base that is equipped with tuyères 70. This air in cooling the solids becomes preheated so this comprises an efficient heat-saving step. Since the de-fluidized bed 15 of solids is more compact than its superjacent fluidized bed 13, it requires less volume so it is advantageous to taper the inside faces of the reactor inwardly toward the bottom, as shown at 71.

It is here pointed out that the bustle pipe and tuyères are used initially to preheat the charge by means of hot combustion gases, to a point where combustion of the normal fuel supply will take place, i. e., about 12–1400° F.

The apparatus described is adapted for the calcination of lime-bearing sludges or muds as result from industrial processes. They include water-softening sludge, paper mill sludge that is frequently called causticizing sludge, sugar factory mud or sludge that results from the first carbonation station or other such lime-using stations in sugar factories, and the like. These may be divided, for the purpose of this invention into two groups; one includes that type of sludges or muds that contain substantially no soda, of which water softening sludge is an example, and one that contains a significant quantity of soda, of which paper mill sludge is an example. Non-soda sludges require soda, or other equivalent adhesive, to be added thereto, whereas soda-containing sludges require a reverse preliminary treatment, namely an adjustment of the soda content downwardly so that it does not exceed 2% and preferably is about 1%. The reason for this is that the amount of adhesive or fuser used for effecting the nodulization of the sludge solids must be enough to cause nodulization of the fine lime particles but yet not cause the nodules themselves to adhere together. To that end, it has been found that if the content of soda or other such adhesive, is kept between ½% to 2% or as close as possible to 1% as the optimum, no such thermo-setting or freezing takes place in the preheating treatment even though the temperature thereof is as high as 1,000° F. Soda melts at 1600° F., so between that temperature and the 1,000° F. at which the preheating is done, there is no thermo-setting of the mass. The distribution of soda must be accomplished when sludge is still wet. That is, soda solution is thoroughly mixed with wet sludge cake. I visualize that the small quantity of soda applied while the sludge is wet covers each particle with a very thin, perhaps molecular, film.

When the layer melts under the heat it creates enough adhesive force to cause one small particle to stick to another small one, or, to a larger one, acting as seed. The adhesive force, however, is not enough to cement two nodules together, at least while they are in turbulent motion due to the gas. Adhesives that are usable include hydroxide or carbonate of alkali metals, or a soluble alkali salt.

In general, the sludge is filtered at 56 to dewater it as much as is commercially possible whereupon the filter cake is diminuted by being passed through a pug mixer or repulper 55. If a non-soda sludge is being treated, the requisite amount of soda is added so that the soda dissolves and coats each sludge particle. But if a soda-bearing sludge is used, the soda content is adjusted to the requisite amount prior to such filtration, such as by washing and thickening.

The resulting mixture of sludge solids with their soda are dried and then preheated at 49 by the use of stack gases or hot products of the subsequent calcining combustion. They are preheated to a temperature controlled so that it is substantially 1,000° F., for if the temperature rises significantly above that, there is a serious tendency of the soda-bearing solids to thermo-set or freeze into a solidified mass. This thermo-setting has also been noticed even in the absence of soda or other reagent, and appears to be a phenomenon attributed to the very fine particle size.

The mixture fed to the drying and preheating treatment should contain about 15% moisture. Filter cake has about 40% moisture but this is brought down in the pug-mixer mill by mixing therein enough heat treated dry solids to bring the moisture down to about the 15% desired. The preheating is done preferably in an upper compartment in the reactor 11 that embodies this invention wherein a bed 42 of such solids is maintained above a transverse horizontally-extending apertured constriction partition 40 through which hot gases comprising products of combustion taking place therebelow, uprise in such velocity that the solids of this bed are maintained in a state of mobility or fluidization wherein they are like a fluid. The hot uprising gases rise from a calcining combustion zone that is maintained at about 1850° F. and are more than enough to maintain the solids of the preheating fluidized bed at the 1000° F. desired, so a portion must be by-passed (through pipe 77) around the bed to the contact drying step. The uprising gases are at such velocity that they blow some solids continually up out of the bed into a superposed cyclone 50 from whence the solids are conducted through a pipe 58 leading back to the bottom of the pre-heating bed 42. But a major part of the preheated solids of bed 42 spill over weir 44 into pipe 28 and are then fed to the calcining bed 13 of the reactor through pipe 25 while in air suspension. This is accomplished by air being added to the solids with such force that the solids are carried by the air under pressure directly into the fluidized upper zone A containing the calcination bed 13 in the reactor. Here the solids encounter a temperature of 1850° F. which is just above the decomposition temperature of the calcium carbonate constituents of the solids, whereupon the solids which in mobilized teetered suspension and fluidization have their calcium carbonate constituents converted into CaO and $CO_2$, namely, they are calcined. Upon being calcined, the solids sink into the lower or de-fluidizing and cooling zone C containing the de-fluidized bed 15. They are de-fluidized because there is less gas and the gas has less velocity than enough to maintain them fluidized and they are simultaneously cooled by heat transfer to the gas. From here, they sink further and descend to discharge as cool nodules from the reactor through discharge pipes 19. During calcination, the solids become nodulized or pelletized. What seems to happen is that a seed forms. This seed picks up or rolls up on itself a coating of more solids and thus becomes a larger nodule or pellet. This in turn picks up or rolls up another coating or more solids and grows into a larger nodule. This process is repeated so that the nodules discharging range in size from plus 35 screen mesh (Tyler) up to one-fourth of an inch in diameter and they are unexpectedly significantly dust-free. However, they contain a minor or insignificant quantity, usually about 10% of inert impurities normal in the original sludge of compounds of soda, silicon, magnesium, iron aluminum, and the like.

Fig. 6 is an enlarged composite showing of such nodules. Nodule N is broken, as shown, discloses a seed nodule N' and that in turn, if broken, discloses a smaller seed nodule N'', and so on.

In starting up, a preliminary seeding of the calcining bed is required so this is done by supplying thereto through pipe 62 to form the initial bed, coarse limestone particles ranging in size from about minus 14 screen mesh to plus 65 screen mesh (Tyler). These particles form the initial seed which roll up into pellets or nodules but thereafter, the process is self-seeding.

Since an important feature contributing to the success of this invention is the composite or dual purpose composite mass of solids maintained in the reactor, it is to be noted that in the upper zone A (bed section 13), wherein calcination takes place, fluidization of the solids therein takes place because of the volume and velocity of gas uprising therethrough. Such velocity can be from 4 to 6 feet per second with optimum being 4.5–5.0. The gas, so uprising, is made up from three contributing sources, namely, (1) the gas supplied directly into the fluidization zone which also is a conveying medium for introducing solids into that zone, (2) products of calcination taking place in that zone, and (3) gas uprising into that zone from the subjacent de-fluidization and cooling zone C (bed section 15). The velocity of the gas uprising in the subjacent de-fluidizing zone is less than that which produces fluidization of the solids therein and yet is sufficient to permit the solids to migrate thereinto from the superjacent fluidized zone and to sink gradually completely through the de-fluidized zone to discharge. Such velocity is from one-fourth to one-half the velocity in the superjacent fluidization and calcination zone.

Another feature of importance resulting from this manner of construction and operation is due to the fact that the sludge solids in the calcination zone are nodulized or pelletized therein meanwhile being fluidized. As the solids of this zone are maintained at calcination temperature, they are incandescent and being fluidized or mobilized, each nodule is surrounded by a gas space. Fresh solids to be heat-treated in the zone are supplied thereto in finely divided if not pulverulent form, so that they pass into the spaces between two or more nodules. The incandescent nodules radiate their heat to these new fine solids whereby they are quickly brought up to calcination temperature. Moreover, when these incandescent nodules sink into the de-fluidization zone, they give up their heat quickly to the gas uprising through that zone and thereby preheat it before it reaches the calcination zone, and this also contributes to the saving in fuel used to heat that zone.

While the invention has been described as applicable to the calcining of lime-bearing sludges or slurries, it may also be used in the burning of cement and in the sintering of red mud (from the Bayer method of processing low-grade bauxite) with limestone and soda ash.

More particularly and referring again to the drawings and especially Fig. 1, it will be pointed out that the lime-bearing sludge or other material to be calcined, is supplied to the filter 56, with or without the soda ash or other fuser 65, as the case may be. Filter-cake from the filter drops into the pug-mixed trough 55 where it is repulped or diminuted and mixed with dried solids descending into the pug-mixed from the cyclone 50. The repulped cake and dried solids are then acted upon by the motor-driven cage mill 57, operating in the enlarged section 49 of the stack 47, whereupon they are dispersed amid and rise with the rising stream of hot gases, thus being dried by contact. After drying the sludge is collected in cyclone 50, conveyed in part back to pug-mixer 55 for feed conditioning, the remainder going to bed 42 through conduit 53 and valve 59 whereupon it (the sludge) is preheated to 1000° F. These solids are fluidized by hot gas from the freeboard space 39 uprising through the apertures 41 in the constriction partition 40 in such volume and at such velocity, that (1) the ball checks 37 are unseated and thus disperse or diffuse the uprising gas, and (2) the solids of the bed 42 are fluidized, mobilized or teetered. When the reactor is shut down, and no gas uprises through the apertures 41, the ball checks 37 become seated and thus seal the apertures 41 against the bed 42 unloading itself downwardly into the next lower bed 13. The uprising gas is hot enough to preheat these solids. Preheated solids flow from the top of the bed or its fluid level 43 over weir 44 and spill down feed-pipe 28.

Dried solids or dust from cyclone 50 in excess of that desired to be fed to the pug mixed 55 falls down pipe 58 to the screw feeder 61 and are thus supplied to the preheating bed 42, beneath the fluid level thereof.

Solids, thus preheated and spilling down pipe 28 are led to pipe 25 where they are joined by a blast of gas or air through pipe 26 with the result that the solids are gas-conveyed to and through the manifold body 18 and thence upwardly through hollow arms 17, and finally they are emitted together with their conveying gas, out into the fluidized bed section 13 past the unseated ball checks 37. If and when gas flows stop, the ball checks 37 seat and prevent solids of the bed 13 from being purged through the arms 17. The bed section 13 and its contents are maintained at calcination temperature by means of burning fuel from pipes 32, either gas or liquid as the case may be, to maintain combustion in that bed. Since the gas supplied with the solids to be treated usually is air, there is enough oxygen present to support calcining combustion at carbonate dissociation or decomposition temperatures.

Incandescent nodulized calcined solids descending or sinking from the fluidized bed 13 become de-fluidized because the volume and velocity of the gas supplied through pipe 30 and wind-box 24 as well as through the tuyères 70 is insufficient to fluidize. The deficiency is made up by the additional gas added through the manifold arms 17 so that the solids in the superjacent bed 13 will be fluidized. The sinking solids give up their heat quickly to the gas uprising against their descent so there is an efficient heat transfer and cooling. Cooled, nodulized, calcined solids discharge from the de-fluidized bed 15 through discharge pipes 19.

Since there is considerably more volume of hot gas in the freeboard space 39 made up of products of combustion and fluidizing gas, it is important to by-pass some of it in order that only enough gas rises through the constriction partition 40 to fluidize the solids in preheating bed 42, and not much more. Such excess gas is by-passed up standpipe 77 that is controlled by valve 48.

With respect to the several valves hereof, they have been indicated in a conventional manner. Valves adapted for meeting the required uses are well known and should accordingly be so selected, for example, valves such as 59, 63, 64, 29 and 20 can well be of types known as rotary or star valves since they execute the function of pressure locks.

I claim:

1. The process for calcining lime-bearing sludge solids, which comprises providing such sludge solids with a content of an adhesive that melts below the decomposition temperature of such sludge solids but does not become thermo-setting at such decomposition temperature, maintaining a bed of such sludge particles heated to calcium carbonate decomposition temperature, passing an oxygen-bearing gas dispersingly upwardly therethrough at a velocity for fluidizing such solids whereby they are turbulently mobilized and act like a fluid, feeding such sludge solids to the bed, and discharging calcined particles descendingly from the bed in nodulized form and substantially dust-free.

2. The process according to claim 1, characterized in that the adhesive used includes at least one selected from a group comprising the hydroxide or carbonate of the alkali metals.

3. The process according to claim 1, characterized in that the adhesive used is a soluble alkali salt.

4. The process according to claim 1, characterized in that the adhesive used is soda.

5. The process according to claim 1, characterized in that the quantity used lies in a range of from substantially one-half to substantially two percent of the sludge.

6. The process according to claim 1, characterized in that the optimum quantity of the adhesive used is 1%.

7. The process according to claim 1, characterized in that the sludge solids and adhesive are dried and preheated to a temperature of not substantially over 1000° F. prior to being supplied to the bed.

8. The process according to claim 1, characterized in that the space velocity of the uprising gas in the bed lies in a range of from substantially 3 feet per second to substantially 6 feet per second.

9. The process according to claim 1, characterized in that the bed is divided into an upper fluidizing section and a lower defluidized section wherein the space velocity of the uprising gas in the upper and fluidizing section of the bed is of the order of 4.5 feet per second whereas the velocity of the uprising gas in the lower and de-fluidizing section of the bed is substantially from one-fourth to one-half the velocity in the upper section.

10. The process of calcining lime-bearing sludge particles, which comprises maintaining an enclosed composite bed of such particles being treated made up of two superposed zones of which the upper zone has combustion supported therein while the lower zone has cooling conditions maintained therein, fluidizing sludge particles in the combustion zone while maintaining such particles incandescent and at calcination temperature by adding sludge particles and fluidizing gas directly to such incandescent particles, sinking such incandescent particles into the lower zone of the bed against a stream of cool gas uprising against the sinking particles at a velocity low enough to de-fluidize them, and discharging cool calcined nodules from the lower zone.

11. The process according to claim 1, wherein fluid fuel is supplied directly to such heated particles.

FRANK S. WHITE.

REFERENCES CITED

The following references are of record in the file of this patent:

UNITED STATES PATENTS

| Number | Name | Date |
|---|---|---|
| 1,377,401 | Crow et al. | May 10, 1921 |